United States Patent [19]

Bauerecker et al.

[11] Patent Number: 5,271,754
[45] Date of Patent: Dec. 21, 1993

[54] PROCESS FOR PRODUCING FLUORESCENT OR PHOSPHORESCENT PIGMENTS COATED WITH GLASS

[75] Inventors: Sigurd Bauerecker, Westerberg 4, D-3305 Sickte; Heiko K. Cammenga, Braunschweig, both of Fed. Rep. of Germany

[73] Assignee: Sigurd Bauerecker, Fed. Rep. of Germany

[21] Appl. No.: 930,976

[22] Filed: Sep. 30, 1992

Related U.S. Application Data

[63] Continuation of Ser. No. 613,871, filed as PCT/DE 89/00185, Mar. 23, 1989, published as WO 89/029250, Oct. 5, 1989, abandoned.

[30] Foreign Application Priority Data

Mar. 24, 1988 [DE] Fed. Rep. of Germany ....... 3809937

[51] Int. Cl.$^5$ ............................................. C03B 19/09
[52] U.S. Cl. ..................................... 65/18/1; 65/18.4; 65/122; 241/30
[58] Field of Search .................. 65/18.1, 18.4, 122; 241/30

[56] References Cited

U.S. PATENT DOCUMENTS

| | | | |
|---|---|---|---|
| 3,389,458 | 6/1968 | Ostrander et al. | 427/376.2 |
| 3,856,550 | 12/1974 | Bens et al. | 427/185 |
| 4,309,481 | 1/1982 | Wakatsuki et al. | 427/218 |
| 4,473,634 | 9/1984 | Dodds et al. | 430/272 |
| 5,051,277 | 9/1991 | Sigai et al. | 427/64 |

FOREIGN PATENT DOCUMENTS 2747509 4/1979 Fed. Rep. of Germany .

Primary Examiner—Shrive Beck
Assistant Examiner—Benjamin L. Utech
Attorney, Agent, or Firm—Salter, Michaelson & Benson

[57] ABSTRACT

A thick glass coating protects fluorescent or phosphorescent pigment particles from greying or fading due to service conditions, such as photochemical reactions. The pigment particles are mixed with a finely ground heavy metal-free glass in a ratio of approximately 5 parts glass to 1 part pigment. The pigment and glass mixture is then heated to a point where said glass is softened to such an extent that the pigment particles are surrounded by the glass. The glass is thereafter comminuted into a granulate consisting of a plurality of small glass bodies. The granulate is reheated so that pigment particles exposed by the comminuting are resurrounded by the resoftened glass. The glass pigment mixture can alternatively be suspended in a liquid and poured into a mold before heating in order to form glass bodies having a particular shape.

15 Claims, 1 Drawing Sheet

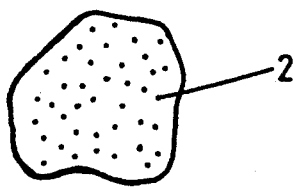 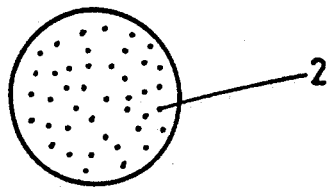 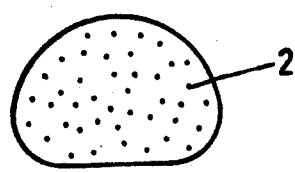
Fig.1a  Fig.1b  Fig.1c
 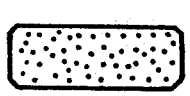 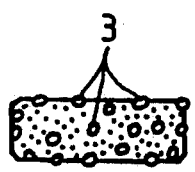 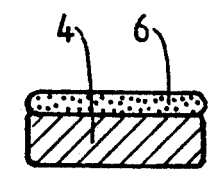
Fig.1d  Fig.1e  Fig.1f  Fig.1g
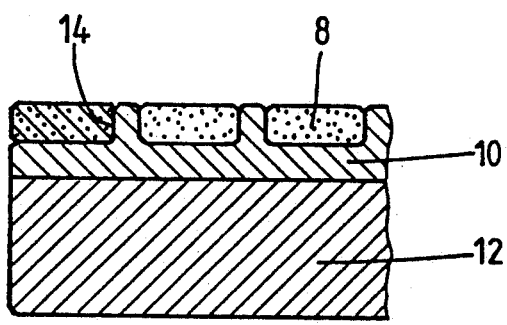 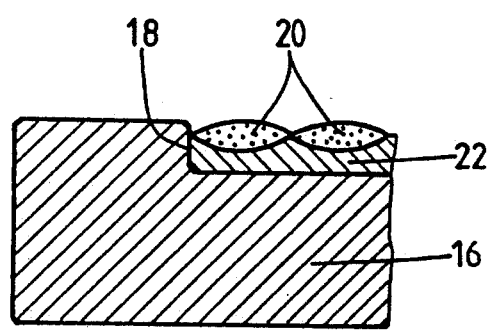
Fig. 2  Fig. 3
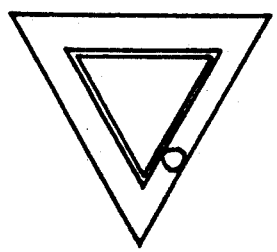 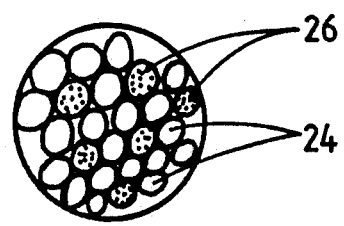
Fig. 4  Fig. 5

PROCESS FOR PRODUCING FLUORESCENT OR PHOSPHORESCENT PIGMENTS COATED WITH GLASS

This is a continuation of application Ser. No. 07/613,871 filed as PCT/DE 89/00185, Mar. 23, 1989, published as WO 89/029250, Oct. 5, 1989, now abandoned.

BACKGROUND AND SUMMARY OF THE INVENTION

The invention relates to a process for producing fluorescent or phosphorescent pigments coated with glass.

Luminescent pigments with fluorescent or phosphorescent properties are to be protected by coating with glass against greying, to which they are susceptible under service conditions after a certain time, for example as a result of photochemical reactions.

Coating of individual pigment crystals with glass according to a sol-gel process has heretofore been known in the art. The German Specification No. 2,747,509 discloses such a process for coating zinc sulphide or zinc/cadmium sulphide based fluorescent or phosphorescent luminescent pigment particles with a glass consisting of:

50 to 90 percent by weight of $SiO_2$ and 10 to 50 percent by weight of $B_2O_3$ and/or $Al_2O_3$ and/or MgO and/or CaO and/or ZnO and/or $Li_2O$ and/or $Na_2O$ and/or $K_2O$.

The procedure according to the invention comprises the following steps:

a) mixing the luminescent pigment into an alcoholic metal alcoholate solution, which may contain water, containing metal oxides in a mixture ratio of 50 to 90 percent by weight of $SiO_2$ and 10 to 50 percent by weight of $B_2O_3$ and/or $Al_2O_3$ and/or MgO and/or CaO and/or ZnO and/or $Li_2O$ and/or $Na_2O$ and/or $K_2O$;

b) allowing said mixture to jelly by diffusing moisture into the mixture; and c) heating said jellied mixture to a temperature of 100° C. to 800° C., preferably of 200° C. to 500° C.

In the process, a fine powder of pigment crystals individually coated with a thin glass layer is obtained. The glass portion amounts to approximately 0.1 to 0.01 percent of the pigment particles by weight.

There are disadvantages, however, to this procedure. It has been found that the glass coated pigments still grey significantly after only one to two weeks of exposure. Further, it has been found that the glass coating produced has very low mechanical strength. For this reason, the pigment particles produced by the sol-gel method are not suitable for use in mechanically loaded phosphorescent coatings, for example, on concrete blocks or concrete slabs which are laid on carriageways.

Luminescent tiles are also known, in which a layer of luminescent pigments is covered by a transparent glaze.

The object of the invention is a process of the kind mentioned in the preamble with which it is possible to produce a glass coating of the pigments which protects the pigment in large measure against weathering effects and has a high mechanical strength.

This object is achieved according to the invention by the features set out in the characterizing part of claim 1.

Suitable developments of the process for the production, and suitable processes for the application, of such glass-coated pigments are contained in the sub-claims.

BRIEF DESCRIPTION OF THE DRAWINGS

The drawings show moulded bodies which are produced by the process according to the invention, together with articles with a phosphorescent surface which are produced with the use of such moulded bodies.

FIGS. 1a, 1b, 1c, 1d, 1e, 1f, 1g show various forms of phosphorescent bodies which consist of pigments coated with glass or are provided with a coating of pigments coated with glass.

FIG. 2 shows in cross-section part of a concrete slab with mouldings embedded in the surface, FIG. 3 shows in section mouldings with phosphorescent properties placed in a depression in a building member, FIG. 4 shows a traffic sign with a surface in which mouldings with phosphorescent properties are embedded, FIG. 5 shows a cut-out from the surface of the traffic sign according to FIG. 4.

DESCRIPTION OF THE PREFERRED EMBODIMENT

Inorganic compounds such as zinc sulphides, zinc cadmium sulphides and alkaline earth sulphides are commonly used as phosphorescent pigments. The phosphorescence is ensured simply by incorporating in the crystal lattice of the base material small quantities of ions foreign to the crystal lattice (activators). These activators are heavy metals (e.g. copper) or rare earths and determine in addition the colour of the radiation emitted.

The commonest pigment with green phosphorescence is zinc sulphide (ZnS:Cu).

Other known phosphorescent pigments are (ZnS,Cd)S:Cu, SrS:Bi, CaS:Bi, ZnS:Cu, (Sr,Ca)S:Bi, ZnS:Ag (Zn,Cd)S:Ag.

Bodies containing such pigments, in which the pigments are coated with glass, are essential subject-matter of the invention. The coating takes place here by fusion of the pigments into a heavy metal-free glass with a softening temperature of less than 800° C., since pigments of the mentioned kind are destroyed at about 800° C. The glass must be free of heavy metals because the oxides of heavy metals such as Pb, Fe, Co, Ni absorb the luminescence of the pigments. The glass must in addition be transparent in the visible optical spectrum and if possible also in the UV spectrum. Finally, the glass must have high alkali resistance, particularly if the bodies are to be embedded in a cement-containing matrix.

Glasses which meet the above requirements are those which comprise combinations of the following components:

|  | percent by weight |
|---|---|
| $SiO_2$ | 20–70 |
| $B_2O_3$ | 5–35 |
| $Li_2O$ and/or $Na_2O$ and/or $K_2O$ | 15–35 |
| CaO | 0–10 |
| $Al_2O_3$ | 0–20 |
| ZnO | 0–5 |
| F | 0–2 |

A glass of the three-substance system $Na_2O$-$B_2O_3$-$SiO_2$ is suitable. The glass can moreover contain some 25 to 30% by weight-preferably 27% by weight—of $Na_2O$, 25 to 30% by weight—preferably 27% by weight—of $B_2O_3$ and 40 to 50% by weight—preferably 46% by weight—of $SiO_2$.

Another glass which meets the above requirements is a glass of the three-substance system $CaO-Al_2O_3-SiO_2$ with the addition of $B_2O_3$ in order to reduce the melting temperature, i.e. with 5 to 10% by weight of CaO, 5 to 20% by weight of $Al_2O_3$, 40 to 60% of $SiO_2$ and 5 to 30% by weight of $B_2O_3$. A fluxing agent may also be added to the glass mixture to reduce the softening temperature of the glass.

The glass is used for the process in finely ground form, namely in a fineness as is usual for enamel fruits, i.e. in a size range extending from 10 to 100 μm, preferably with a mean size of some 25 to 35 μm. Transparent enamel frits can thus be used, for example commercial lead-free aluminium-enamel frits without opacifiers. Glasses used for the production of enamel frits generally have a low melting temperature.

For example, the frits R1780, R1568, R1569 of Reimbold & Strick, Cologne, are suitable, despite the non-optimal transparency of these enamels. The solder glasses used can, for example, be the solder glasses 8470 and G0107 of Schott Glaswerke, Mainz.

The luminescent pigments used for the process generally have a mean grain size of 40 to 50 μm.

In order to produce bodies with fluorescent or phosphorescent properties, the finely ground glass and the powdery pigment are mixed in the ratio 100:1 to 1:1, preferably 5:1 to 2:1. The mixture is then heated to a temperature at which the glass is softened to such an extent that the pigment is coated with the glass on all sides. The glass has to have a viscosity of the order of magnitude of 10 to $10^5$ dPas at the final temperature.

In the case of a glass with a density of approximately 2.3 and a density of the pigment of approximately 4 a viscosity of 4.5 to $6.5 \times 10^5$ dPas has proved suitable.

The mentioned viscosity is reached for the mentioned glasses at a temperature of 650° to 750° C. If the viscosity is adhered to, it is ensured that on the softening of the glass the pigment remains in the glass in essentially the same distribution in whch it occurs in the mixture.

The desired viscosity can be adjusted by common additives influencing the viscosity such as binders and wetting agents.

In order to achieve for the bodies to be described further below a good adhesion in silicate building materials, for example in concrete mixtures, the mixture can be blended additionally with 5 to 30% by weight of white quartz sand with a grain size of some 100 to 500 μm.

Bodies of luminescent pigments coated with glass can be produced as granulate or as mouldings.

In order to produce granulate, the mixture of finely ground glass and pigment, in certain cases with the addition of quartz sand, is melted for example in crucibles. The body so formed is then comminuted, giving rise to granulate of irregular form which can have a grain size between 0.1 and 20 mm. Since fracture surfaces between the glass matrix and the pigments embedded therein often occur during the comminution of the molten blocks, i.e. a portion of the pigments is unprotected after the comminution of the glass block, the granulate is preferably heated once again to softening temperature, for example in a tunnel oven. The glass coating thereby closes up in the case of the vast majority of the fracture surfaces due to which the pigments are exposed. If the granulate is fused onto a substrate during further processing, for example in order to produce a phosphorescent surface on signs or similar, renewed heating to softening temperature can be dispensed with, since this softening temperature is in any case reached again during fusion onto a preferably metallic substrate and gaps in the coating are then closed.

A typical pellet is represented as an example in FIG. 1a. It can be seen from this that this pellet 2 contains embedded in the glass matrix a large number of pigment grains which are indicated by dots, together, if provided, with quartz sand grains, which are not shown in FIG. 1a.

Mouldings can also be produced from the mixture prior to the heating.

In order to achieve compression and improve consistency, an adhesive agent and/or water can be added to the mixture.

In order to produce mouldings, the glass-pigment powder mixture is suspended or rendered pasty with a liquid, in particular with water. The liquid can contain residue-free burning binders and/or wetting agents. For the production of freely forming mouldings a suspension is produced which is dripped onto a hydrophilic base. The surface tension of the liquid added to the mixture produces moreover a spherical or hemispherical shape as shown in FIGS. 1b and 1c. The hemispherical shape can be produced moreover by the suspension's own weight. Relatively solid spheres or hemispheres are produced by vaporization or diffusion of the liquid into the base, and these can be fused e.g. in the tunnel oven. Spheres with diameters between 0.1 and 20 mm can be produced in this way, as shown in FIGS. 1b and 1c.

Mouldings can also be produced by compression moulding, for example in known tablet presses. Here again the glass-pigment powder mixture is mixed with a binder and in certain cases with a wetting agent and adjusted to a consistency suitable for the tabletting. The tabletting makes cost-effective mass production possible. The mouldings can moreover be lenticular, as shown in FIG. 1d, or else cylindrical or with a polyhedral shape similar to a hexagon or octagon. Mouldings from 1 to 50 mm in size can be produced economically by tabletting.

As already mentioned above, quartz sand can be added to the mixture in order to enhance the adhesion in silicate binders. A moulding according to FIG. 1e with such a quartz sand addition 3 is shown diagrammatically in FIG. 1f.

The luminescence of the pigments, viewed from the exposed surface into their interior, decreases rapidly, due among other things to the fact that deeper lying pigments lie in the shadow of pigments lying above them. For many applications, in particular in road building or similar, high mechanical strength is required of the glass-pigment bodies in the form of granulate or else moulded bodies. This necessitates a certain minimum volume in many cases. Because of this, however, only a small part of the pigment used is actively utilized.

In order to achieve increased utilization of the pigment addition, the glass-pigment mixture can also be fused onto a base material in a relatively thin layer. Quartz gravel, for example, and also pre-formed bodies of glass or ceramic, can be used as the base material. The glass-pigment mixture is in this case suspended in a liquid like an enamel frit, and in addition residue-free burning binders and/or wetting agents can also be added. The suspension is then applied to the base materials, and the glass in the top coat is then fused on, for example in a tunnel oven.

Tests have shown that good results in terms of glass adhesion and thermal expansion characteristics can be achieved with the application of such layers in thicknesses up to 1 mm onto quartz gravel and spheres of glass and clay. The glass-pigment layer can surround the base on all sides, or else be applied on one side, as shown in FIG. 1g. A glass-pigment layer 6 is here fused onto a substrate 4 which can be a hard-burnt ceramic moulding.

Glass-pigment bodies as described can be used, for example, to produce phosphorescent surfaces in the building and civil engineering sector. The glass-pigment bodies can be embedded in a matrix containing a silicate binder, cement preferably being used as silicate binder. Lime and gypsum can however also be used as binder. The matrix itself should have the highest possible reflectance. White cement with fillers consisting of quartz sand or quartz glass is preferred as a binder in this case.

Mixtures of white cement, quartz sand and glass-pigment bodies in the form of broken granulate and/or spheres can be used as facing layers of precast concrete compound units or as finishes which are applied to the areas to be marked. The active surfaces of the glass-pigment bodies must be cleaned as thoroughly as possible after the hardening of the matrix so that the unimpeded entry of light and exit of the luminescence is guaranteed.

The composition of concrete facing layers or finishes with phosphorescent properties will be given below as an example.

To produce the granulate, 10 parts by weight of lead oxide-free solder glass no. 8470 of Schott Glaswerke, Mainz, in powder form, grain class K3 (99%<60 $\mu$m, 50%<10 $\mu$m) with a melting temperature of approx. 680° C. were mixed with 3 parts by weight of a luminescent pigment of the chemical composition ZnS:Cu with a grain size of some 40 $\mu$m and melted at the melting temperature of the solder glass. The glass block so produced was comminuted, and the granular fraction 4 to 6 mm was screened out.

Granulate using as glass an enamel glass R 1780 of Reimbold & Strick, Cologne, was produced in the same way.

13 parts by weight of the granulate so produced with a grain size of 4 to 6 mm were mixed respectively with
a) 20 parts by weight of white cement as binder,
b) 90 parts by weight of white pure quartz gravel/-sand as filler and
c) 8 parts by weight of water.

The mixture was introduced into a mould as facing layer and backfilled with ordinary concrete.

Using concrete slabs with facing layers according to the previous examples, comparative tests were carried out on concrete slabs which had been produced according to the German specification DE-OS 1,471,345, which discloses a method of directly imbedding luminescent pigment into the concrete. Specifically, the German reference discloses the mixing of fluorescent organic coloring substances with ordinary concrete components, such as grit, ground mineral substances, sand, and binding agents including cement and synthetic resin binders. It is pointed out that synthetic resins, such as thermoplastic and thermo-hardening resins are the preferred binders. The organic coloring substances are generally mixed with the resins before the resins are completely hardened, whereafter the mixture is allowed to completely harden. Thereafter, the hardened resin mixture containing the coloring substances is ground. The ground "pigments" can then be mixed into the concrete in a quantity of 0.2 to 5 percent by weight of the complete mixture.

In concentrated hydrochloric acid with additional heat supply the standard samples dissolved substantially after a short time. They lost their phosphorescent properties completely, because the pigment decomposed with the release of hydrogen sulphide. In contrast, the glass-pigment bodies of the samples containing the pigments embedded in glass according to the invention were completely preserved in terms of moulding properties and phosphorescent properties.

Under less drastic conditions also it was observed that zinc sulphide-based luminescent pigments freely embedded in concrete are destroyed by acids. Greying moreover occurs under the simultaneous action of UV radiation and air humidity. Samples of equal weight containing varying pigment portions were subjected to dripping with 3% sulphuric acid for three hours under intensive UV radiation (UV lamp at distance of 5 to 10 cm). Slight material wear was observed on all the samples; slight greying occurred on the standard samples. The samples according to the invention remained unchanged with respect to their phosphorescent properties.

In a further test, samples were exposed to natural weathering effects on a roof for two months. No impairment of the surface was detected. The phosphorescence intensity of the standard samples subjected to the test was far less than that of standard samples which had been kept in a dry area. This fading is attributed to the natural UV radiation with the simultaneous effect of humidity. In the case of the samples according to the invention, no change in the phosphorescence intensity was detected in the tested samples compared with the samples kept in a dry area.

The applying of phosphorescent surfaces and/or building components is particularly advantageous in the case of the following objects or in the following locations: in dimly lit localities, on country roads, on kerbstones, airports, landing strips, towers, chimneys and similar.

The glass-pigment bodies can be used to produce blocks or slabs with phosphorescent surfaces in particular for road building. In this case, as indicated above with the examples, a facing layer containing glass-pigment bodies is first of all introduced into the mould and the mould is then filled up with concrete. In this case also the glass-pigment bodies lying at the surface must then be cleaned.

For the production of concrete slabs or concrete blocks, the mouldings described above can, in addition to granulate form, also be used as spheres or in the form of lenses, cylinders or slabs, as described above with reference to FIGS. 1b to 1g. Such mouldings can moreover be pre-arranged on an adhesive film which is coated with a setting inhibitor. This adhesive film with the mouldings adhering thereto is then placed in the mould, the alkali-free matrix mixture consisting of white cement, quartz gravel and water for the facing layer is then applied to the mouldings and the mould is then filled up with concrete.

After the setting of the concrete the adhesive film is removed, and the part of the facing layer which has not set due to the setting inhibitor can then be washed off and the surface of the glass-pigment mouldings therefore cleaned.

A cross-section through a concrete slab produced in the manner described is shown in FIG. 2. The glass-pigment mouldings 8, which are here formed with the addition of quartz sand according to FIG. 1e or preferably according to FIG. 1f, are embedded in the alkali-free facing layer 10 which rests on the load-bearing concrete layer 12.

Concrete is usually alkaline and has a pH value of over 10. There is therefore the risk of alkali encroachment onto the glass, in which alkaline solutions split up the $SiO_4$ network, so that the glass completely dissolves. In addition to the use of an alkali-resistant glass as a counter-measure, care should be taken to ensure as low an alkalinity as possible of the binder in that part of the matrix of the concrete which makes direct contact with the glass-pigment bodies, for example by the use of a special cement with low alkali content or by means of additives such as phonolites in the matrix mixture for the facing layer.

The glass-pigment mouldings can also, as indicated on the left of FIG. 2, be produced with a ceramic moulding 14 as substrate, which is provided with a glass-pigment layer as represented in FIG. 1g and described above. Quartz blocks flashed with a glass-pigment layer, in certain cases with the addition of quartz sand, can also be used.

Glass-pigment bodies can also be inserted subsequently into building components subjected to high mechanical loads. These building components can be suitably pre-formed, e.g. by the provision of a recessed seat for such bodies. Such seats can however also be milled subsequently. Railway platform edges or carriageway markings can be mentioned as examples of this.

A possible embodiment is represented in FIG. 3. In a building component 16, for example a railway platform edge, a recess 18 is provided. There is here placed in the latter a layer of lenticular glass-pigment bodies 20. These bodies 20 can be placed in turn in a matrix 22 containing a silicate binder. A matrix containing a plastics binder, for example an epoxy resin as binder, would also be conceivable. The glass-pigment bodies can also be bound in an elastomeric layer, preferably a chlorine-rubber layer.

In addition to silicate binders, it is also possible in principle to consider as binders for the embedding of the glass-pigment bodies thermoplastic or thermoset materials and elastomers, for example polyethylene, polyvinyl chloride, polyamides, polyurethanes, polystyrene, polyester, epoxy resins, silicones, silicone rubber and natural and synthetic rubber. The binders can once again be provided with fillers. Care should be taken in this case to ensure the highest possible transparency of the binder and the fillers.

Glass-pigment bodies can be applied to any surfaces by means of the above-mentioned thermoplastic or thermoset materials and elastomers. For example, a phosphorescent coating of traffic signs is thus possible. Individual phosphorescent marking points, for example on door panels for marking the key-hole, are however also possible.

The glass-pigment bodies can however also be fused onto a metal substrate by heating to the softening temperature without a matrix.

In the case of traffic signs, as represented for example in FIG. 4, light-reflecting layers in the form of very small glass spheres 24, as shown in FIG. 5, are applied in many cases. If such reflective bodies (glass spheres 24) are applied to the sign in combination in particular with spherical-shaped glass-pigment bodies 26, such signs are also endowed with phosphorescent properties in addition to the reflective property.

We claim:

1. A process for producing a fluorescent or phosphorescent glass body comprising the steps of:
    mixing finely ground glass particles with powdery fluorescent or phosphorescent inorganic pigment particles in a ratio in the range of 100:1 to 1:1 to form a pigment and glass mixture, said glass particles having a softening temperature of less than 800° C. and comprising:

|  | percent by weight |
| --- | --- |
| $SiO_2$ | 20-70 |
| $B_2O_3$ | 5-35 |
| $Li_2O$ and/or $Na_2O$ and/or $K_2O$ | 15-35 |
| CaO | 0-10 |
| $Al_2O_3$ | 0-20 |
| ZnO | 0-5 |
| F | 0-2 | and heating said pigment and glass mixture to a point where said glass particles are softened to such an extent that the glass particles flow together to form a glass body, said pigment particles becoming imbedded in said glass body.

2. The process of claim 1 further comprising the step of adding a fluxing agent to said mixture to reduce the softening temperature of said glass particles.

3. The process of claim 1 further comprising the step of adding a fine-grained quartz sand to said mixture.

4. In the process of claim 1, said glass particles comprising $Na_2O$, $B_2O_3$ and $SiO_2$.

5. In the process of claim 4, said glass particles comprising 25-30% by weight $Na_2O$, 25-30% by weight $B_2O_3$ and 40-50% by weight $SiO_2$.

6. In the process of claim 5, said glass particles comprising 27% by weight $Na_2O$, 27% by weight $B_2O_3$ and 46% by weight $SiO_2$.

7. In the process of claim 1, said glass particles comprising 5-10% by weight CaO, 5-20% by weight $Al_2O_3$, and 40-60% by weight $SiO_2$ and further comprising 5 to 30% by weight $B_2O_3$.

8. In the process of claim 1, said glass particles comprising lead-free transparent aluminum-enamel frit.

9. In the process of claim 1, said glass particles being mixed with said pigment particles in a ratio in the range of 5:1 to 2:1.

10. The process of claim 1 further comprising the step of granulating said glass body.

11. In the process of claim 10, said granulated glass having a size in the range of 0.1 mm to 20 mm.

12. The process of claim 11 further comprising the step of reheating said granulated glass to a point where said granulated glass is softened to such an extent that pigment particles exposed by said granulating are surrounded by said softened glass.

13. In the process of claim 1, said mixing step further comprising the steps of suspending said mixture in a liquid and pouring said liquid mixture in a mold prior to heating.

14. In the process of claim 13, said mold comprising a spherical-shaped mold.

15. In the process of claim 13, said mold comprising a slab shaped mold.

* * * * *